Figure 19:
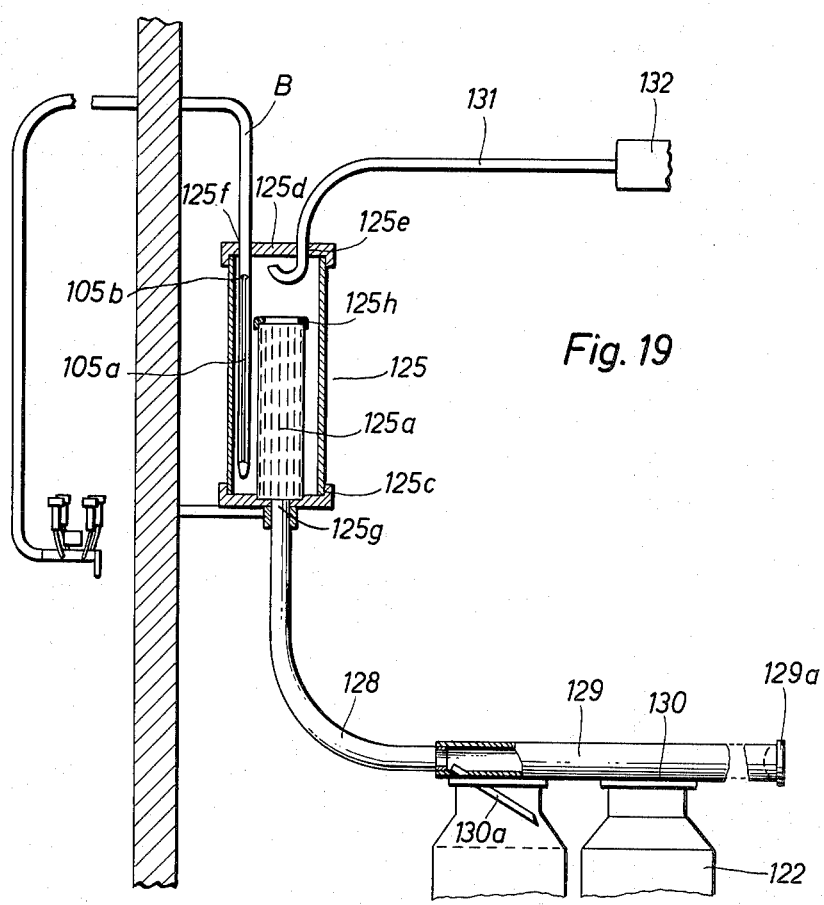
Figure 20:
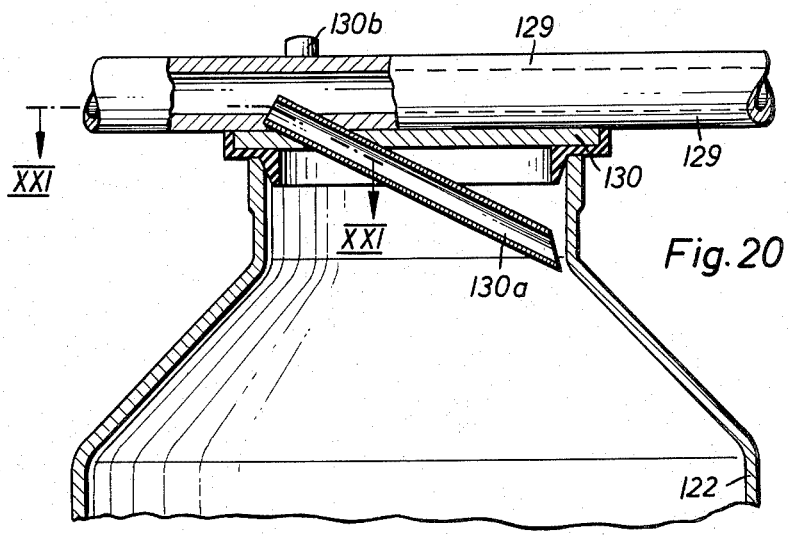
Figure 21:
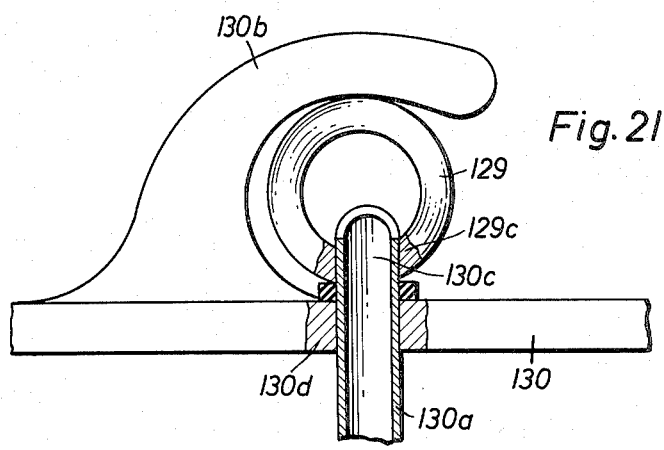

Feb. 8, 1966  G. KARNATH  3,233,589
CLAW FOR A MILKING APPARATUS
Filed Sept. 28, 1961  16 Sheets-Sheet 1
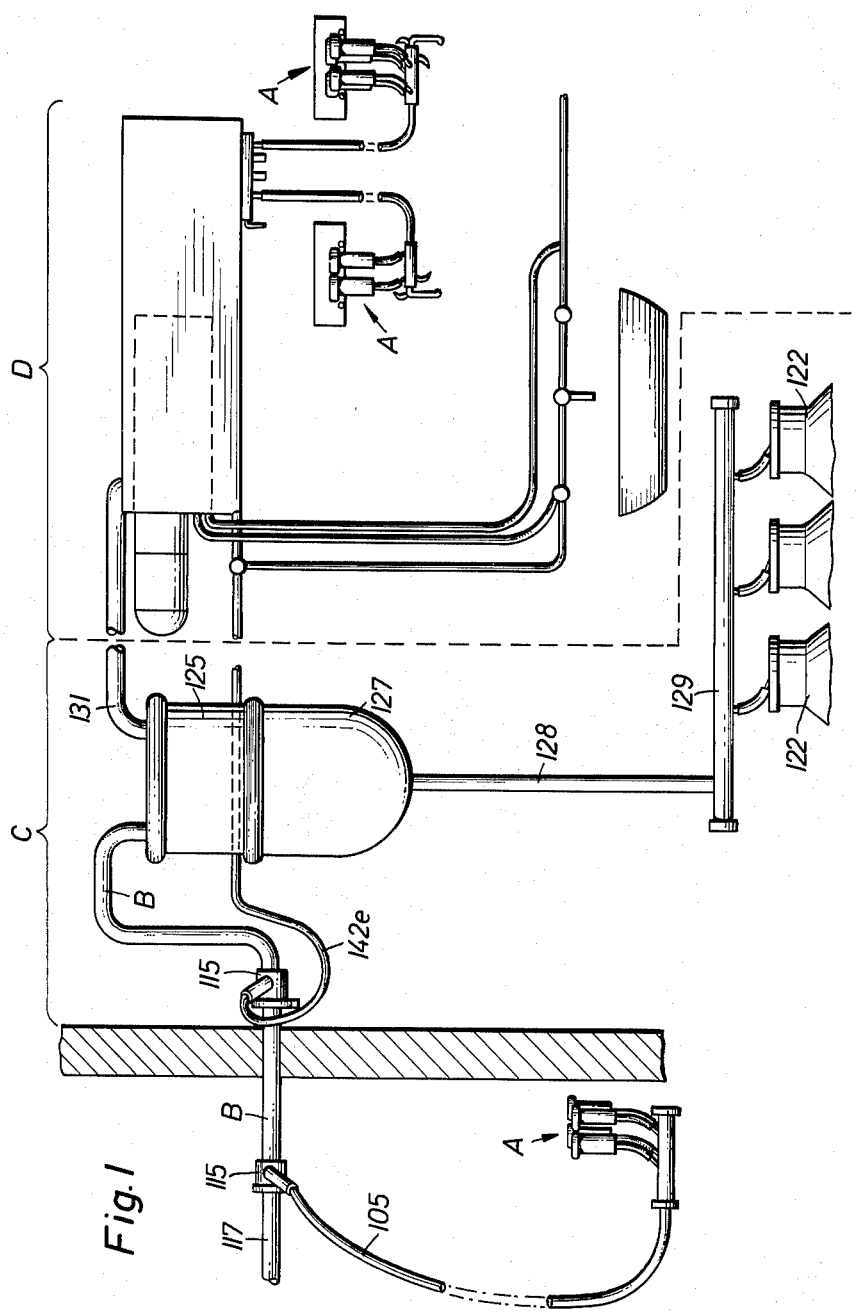
INVENTOR
G. Karnath
BY
Richards & Geier
ATTORNEYS

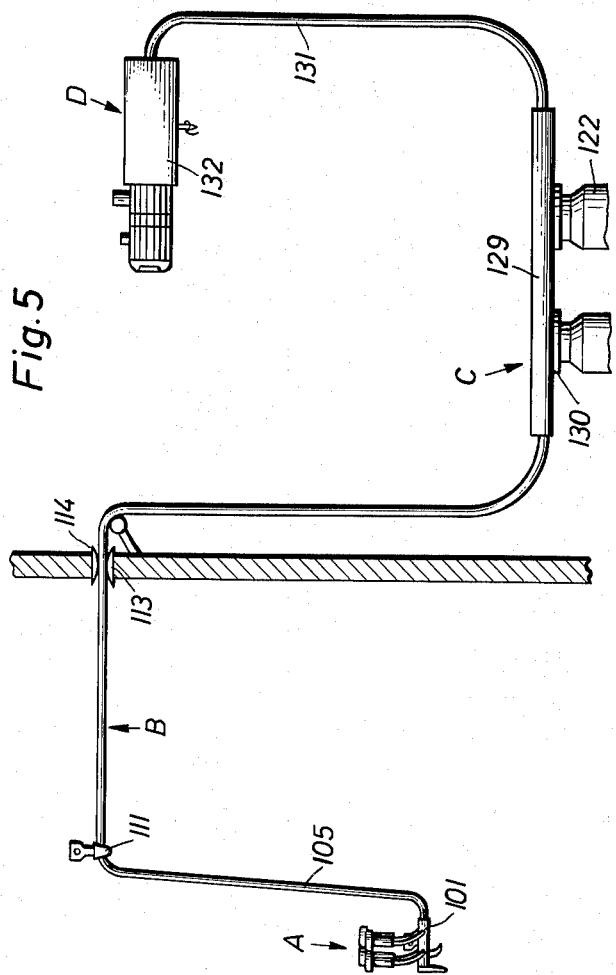

Feb. 8, 1966  G. KARNATH  3,233,589
CLAW FOR A MILKING APPARATUS
Filed Sept. 28, 1961  16 Sheets-Sheet 3
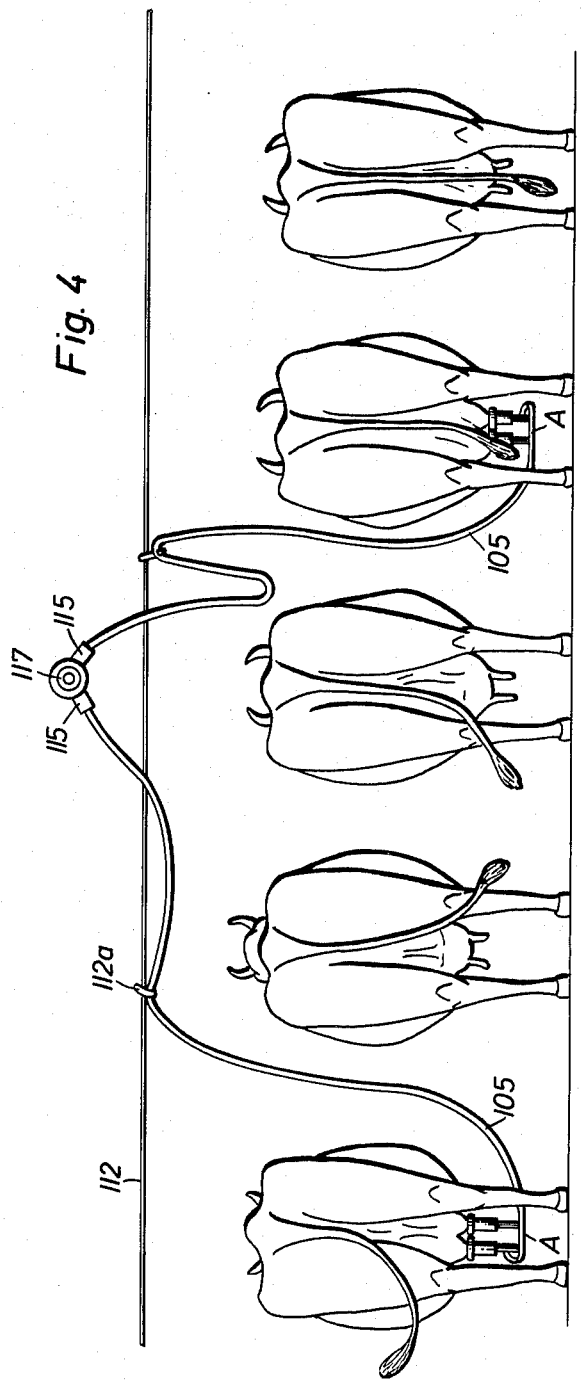
INVENTOR
G. Karnath
BY
Richards & Geier
ATTORNEYS

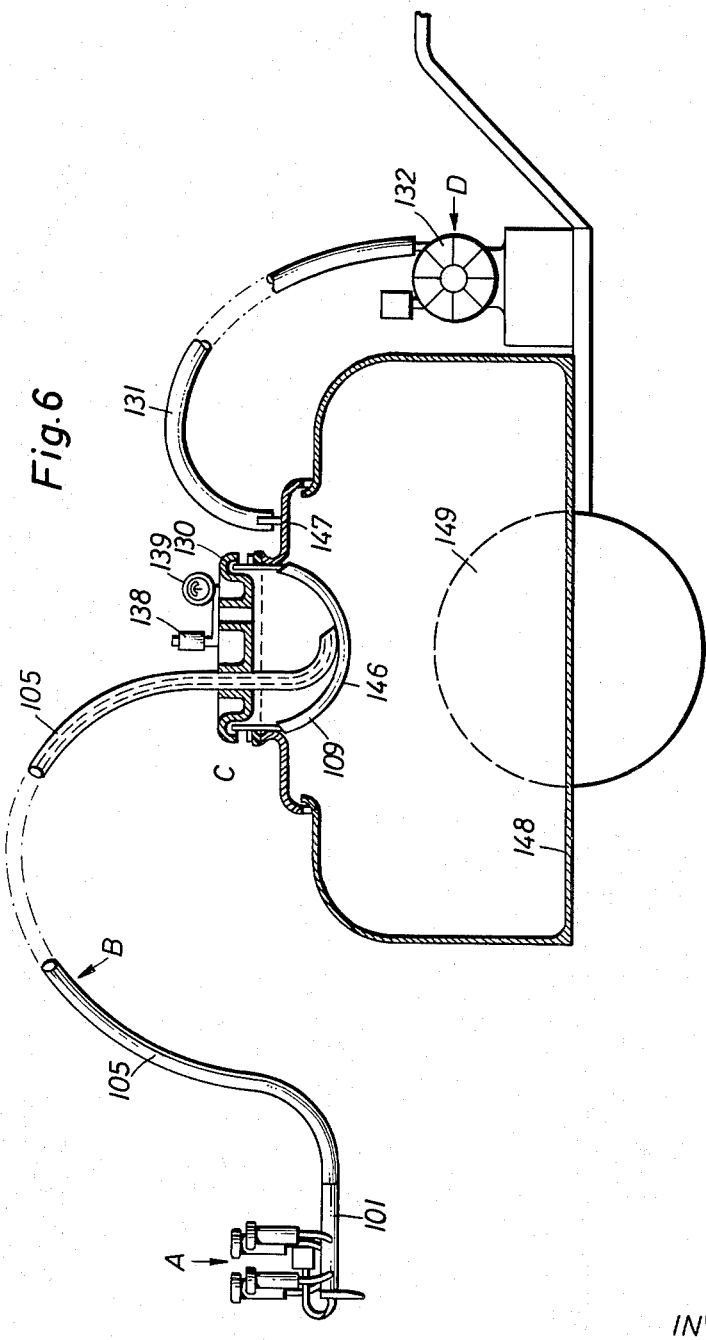

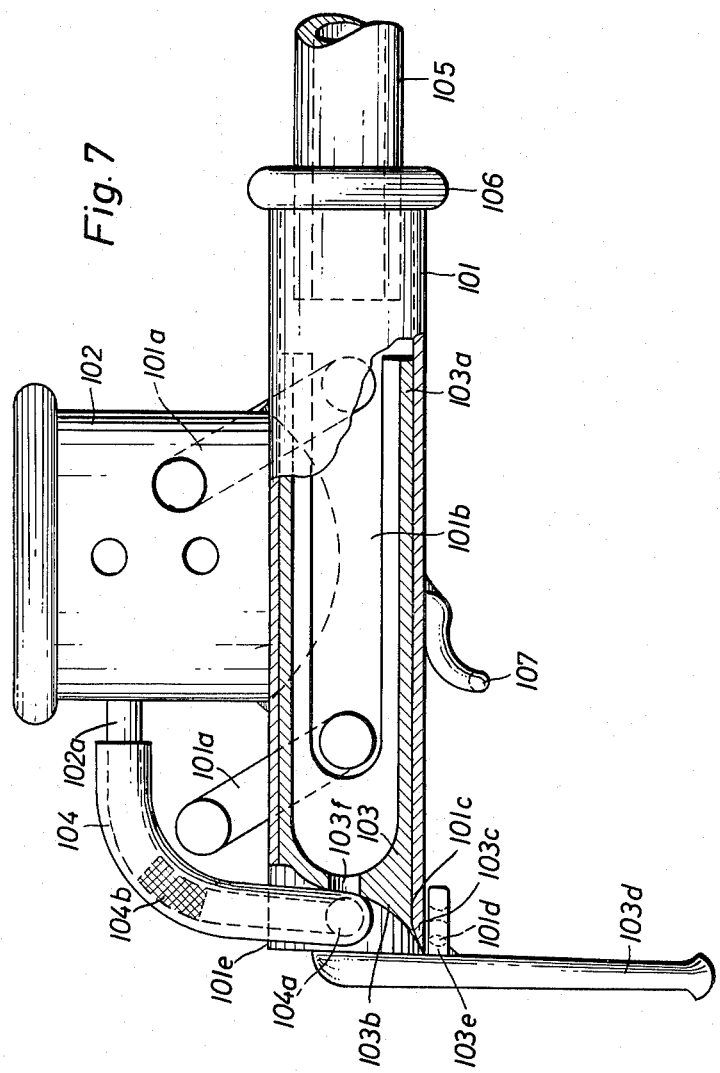

Feb. 8, 1966  G. KARNATH  3,233,589
CLAW FOR A MILKING APPARATUS
Filed Sept. 28, 1961  16 Sheets-Sheet 7
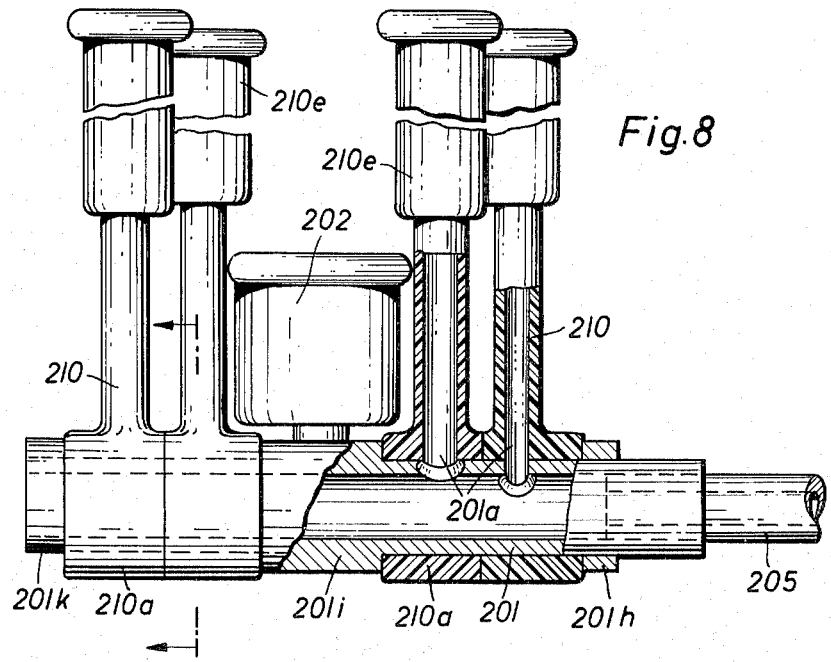
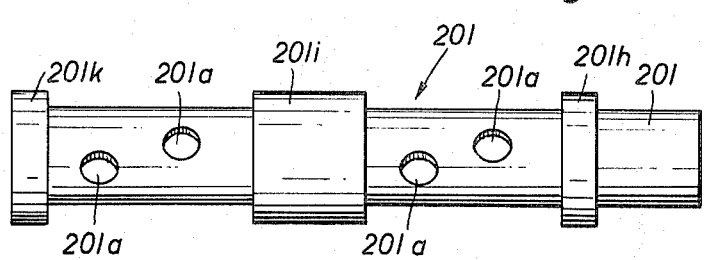
INVENTOR
G. Karnath
BY
Richards y Geier
ATTORNEYS Feb. 8, 1966  G. KARNATH  3,233,589
CLAW FOR A MILKING APPARATUS
Filed Sept. 28, 1961  16 Sheets-Sheet 8
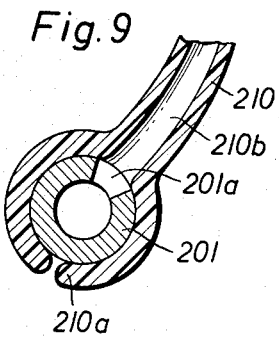
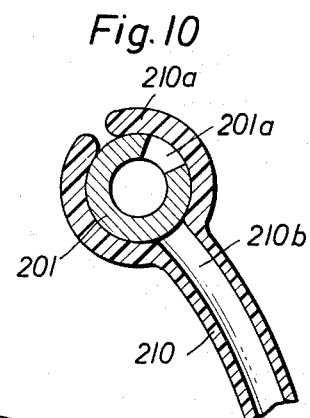
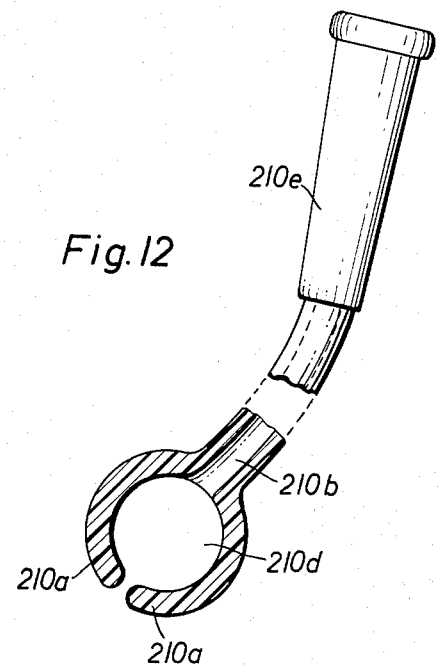
INVENTOR
G. Karnath
BY
Richards & Geier
ATTORNEYS

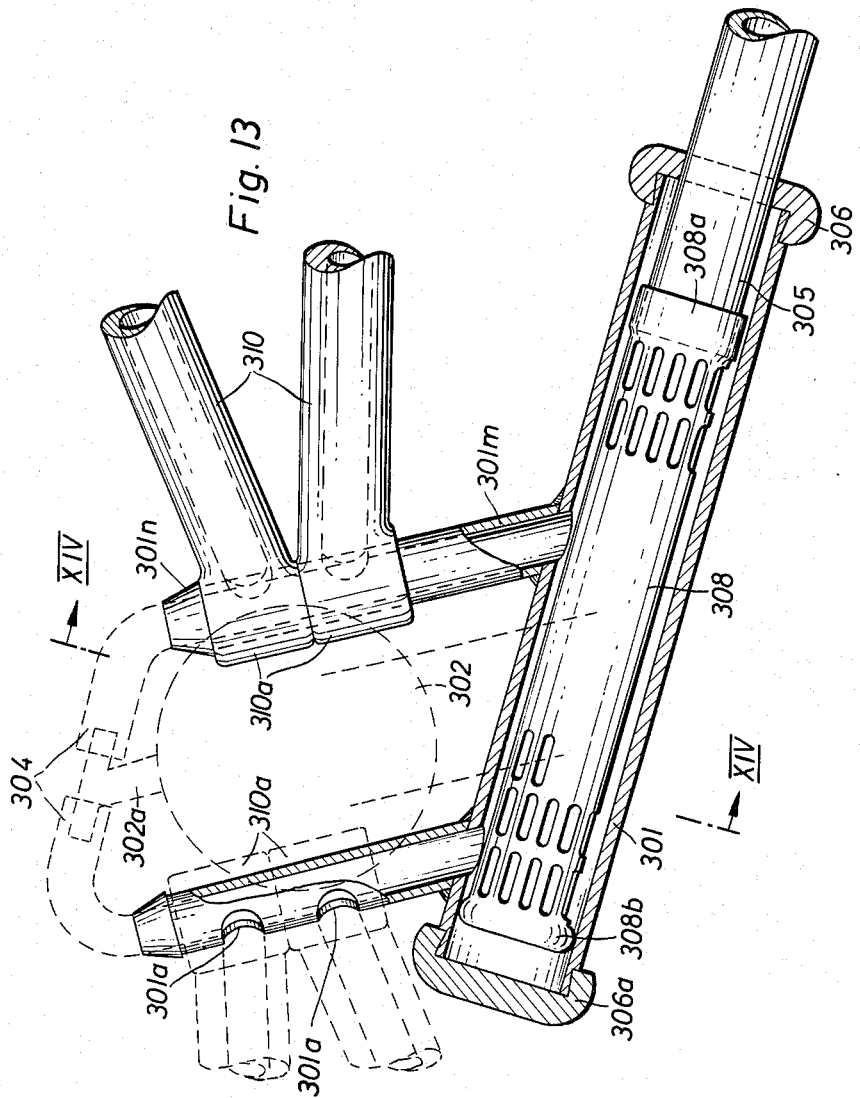

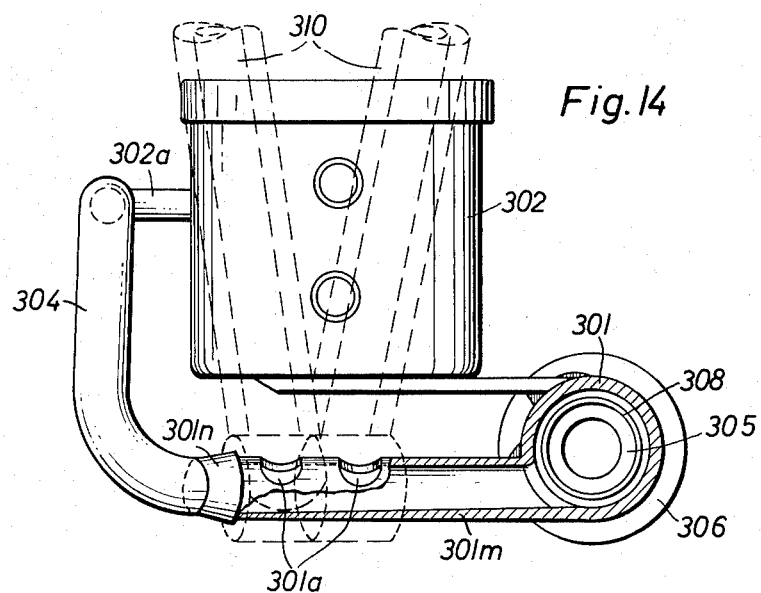
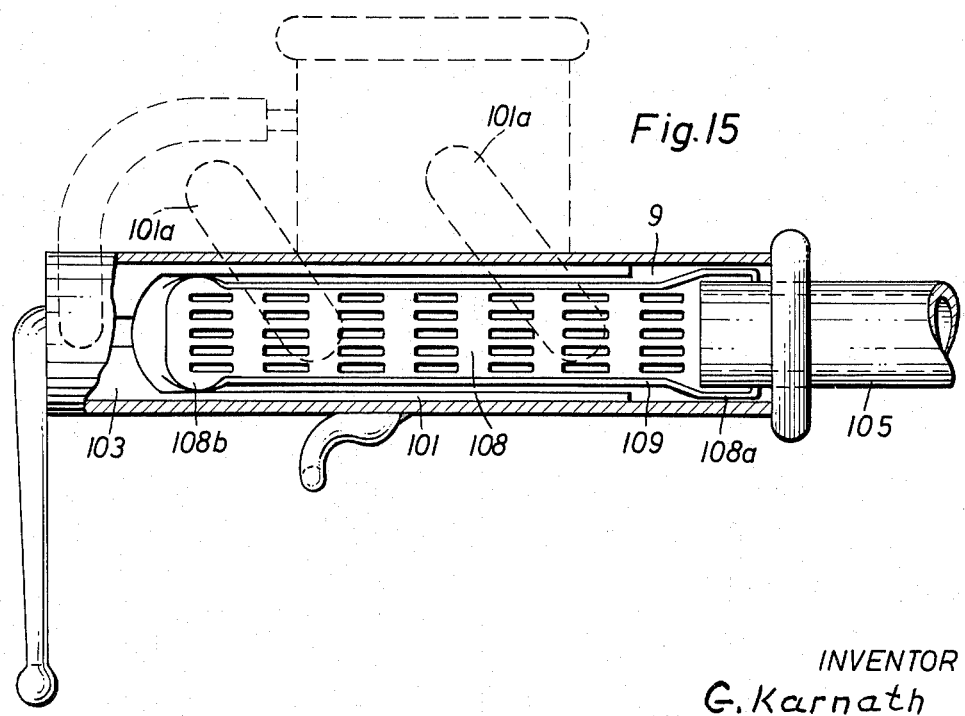

Feb. 8, 1966   G. KARNATH   3,233,589
CLAW FOR A MILKING APPARATUS
Filed Sept. 28, 1961   16 Sheets-Sheet 11
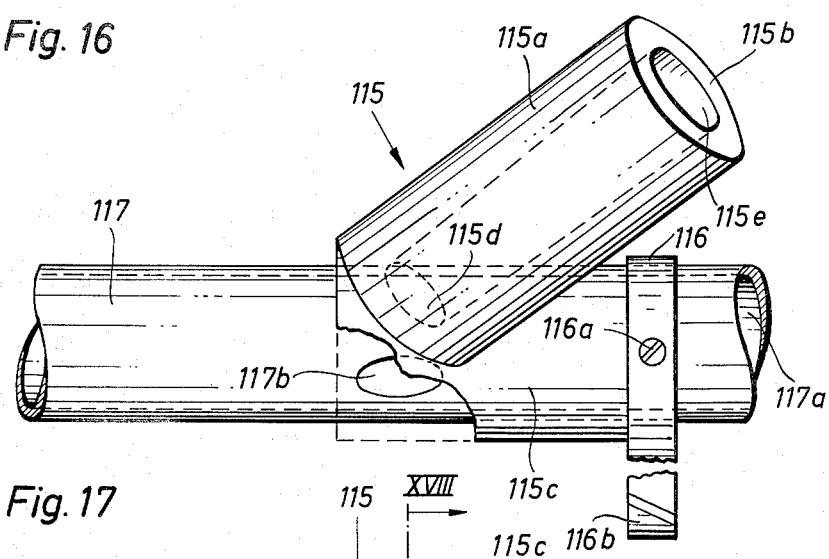
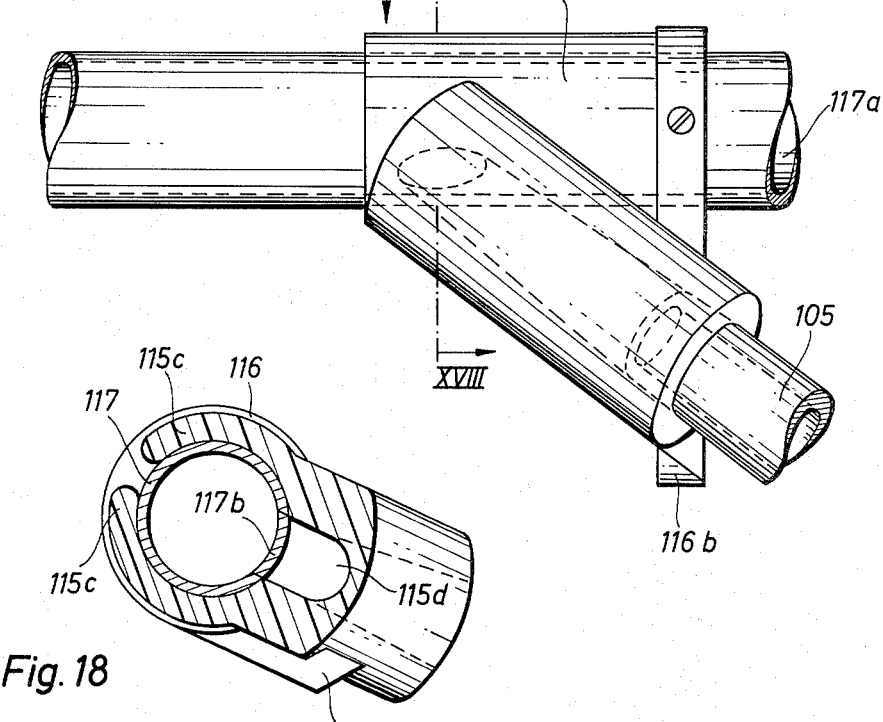
INVENTOR
G. Karnath
BY
Richards & Geier
ATTORNEYS Feb. 8, 1966  G. KARNATH  3,233,589
CLAW FOR A MILKING APPARATUS
Filed Sept. 28, 1961  16 Sheets-Sheet 14
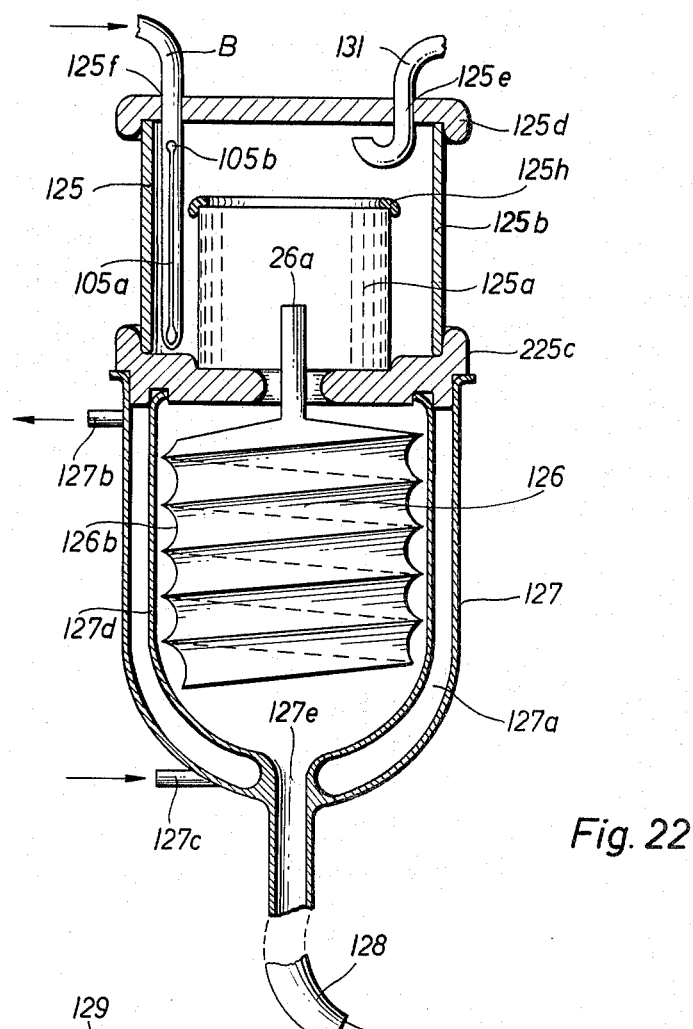
Fig. 22
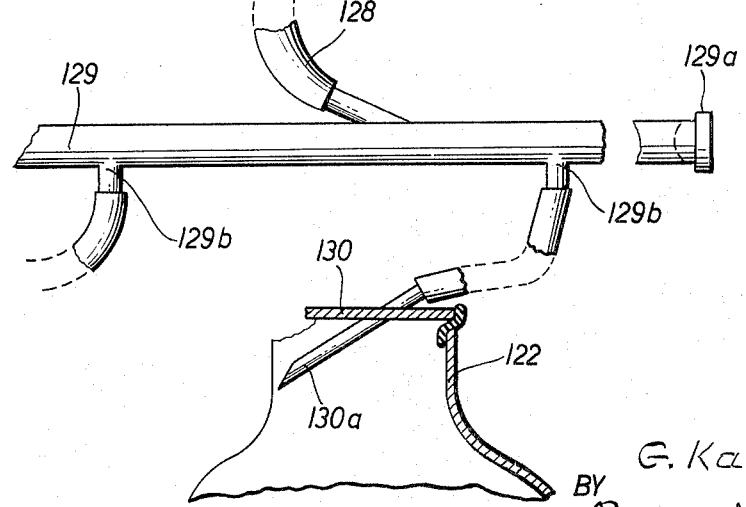
INVENTOR
G. Karnath
BY
Richards & Geier
ATTORNEYS

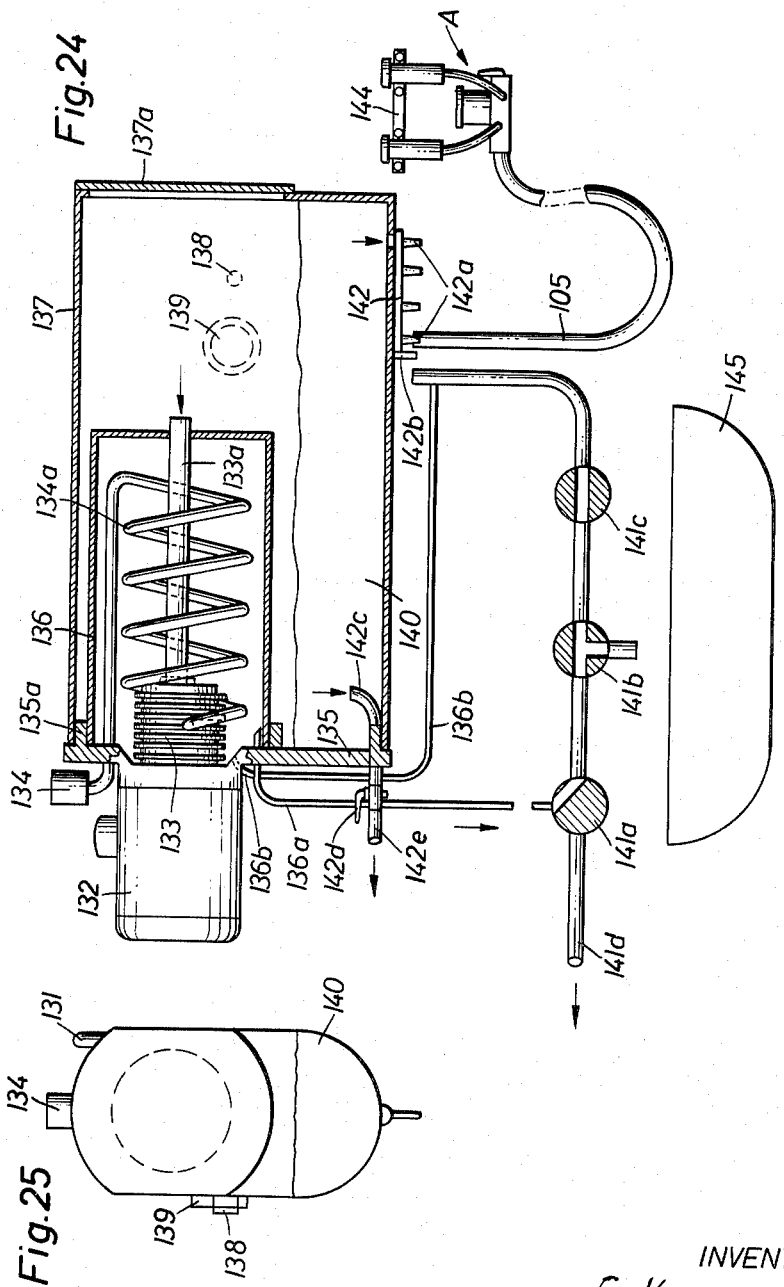

United States Patent Office 3,233,589
Patented Feb. 8, 1966

3,233,589
CLAW FOR A MILKING APPARATUS
Günther Karnath, Hertingerstrasse 92, Unna,
Westphalia, Germany
Filed Sept. 28, 1961, Ser. No. 141,473
Claims priority, application Germany, Sept. 30, 1960,
K 41,793; Oct. 3, 1960, K 41,802; Feb. 6, 1961, K
42,830; Mar. 1, 1961, K 43,049; Mar. 16, 1961, K
43,205, K 43,206; Apr. 10, 1961, K 43,429, K 43,430;
Apr. 13, 1961, K 43,460; May 15, 1961, K 43,728;
July 5, 1961, K 44,177
2 Claims. (Cl. 119—14.54)

This invention relates to a milking apparatus which is operated by suction. The invention refers more particularly to an apparatus of this type which is provided with a single conduit for the removal of milk along with means simultaneously supplying a current of rarefied air for actuating the milking device.

Prior art knows two basic types of suction-operated milking devices, namely, stationary suction devices with two conduits (sometimes a single conduit) and movable suction-operated milking devices with two conduits or one conduit.

Prior art suction-operated milking devices having a single conduit for the removal of milk and means simultaneously supplying a current of rarefied air for actuating the milking means, have the drawback that the milk filtering means, cooling means and can-filling means are subjected to a powerful air current of the means producing rarefied air under pressure, with the result that the under-pressure in the milk-sucking devices is not uniform any more and that the aggregate is subjected to continuously increasing output requirements. Furthermore, the cleaning and disinfection of prior art suction-operated milking devices was very difficult, since the attachments and connections of single-conduit devices as well as multi-conduit devices were so constructed that milk deposits could easily settle thereon. Since such milk devices constitute a suitable medium for nourishing lactic acid bacteria and the like, the stability of milk was greatly diminished in prior art devices. Furthermore, quality of milk produced by prior art devices was further diminished by the fact that the partial currents of milk were joined while flowing substantially perpendicularly to each other through the fittings. This produced churning effects which diminished the fat content of the milk. Flow guiding devices increase these churning effects to a substantial extent when partial currents of rarefied air flow substantially perpendicularly from branch conduits into the main conduit and also by the fact that in prior art milk remained in motion up to the end of the milking. An installation of this type causes the formation of butter particles and thus the above-mentioned diminution of the fat content.

An object of the present invention is to eliminate the drawbacks of prior art devices through the provision of a suction-operated milking apparatus having a single conduit for the removal of milk and provided with means simultaneously guiding a current of rarefied air for actuating the milking means; it is so constructed that the milk is guided uninterruptedly, smoothly and without impediments from the milking means to the milk transporting container and that the filtering, cooling and filling procedures are independent from the rate of change of rarefied air pressure. Thus such apparatus will preserve the milk while it is being transported and collected, so that milk of the same quality with which it was produced during the milking, filtering and cooling stages will be gathered in the transporting container.

Another object of the present invention is the provision of a suction-operated milking apparatus of the described type which will make possible a particularly simple and effective cleaning and disinfection of the entire system. According to the present invention these simple and particularly effective cleaning facilities are made possible by the heating of the cleaning water by the operating heat of the vacuum pump, so that a thorough cleaning of the installation therewith is made possible.

A further object of the present invention is the provision of a suction operated milking apparatus which is so constructed that the danger of contaminating or polluting the milk is effectively avoided from the time the milk is produced and until it is poured into the transporting containers. This can be particularly effectively attained by a construction of the present invention wherein all the treatments to which milk is subjected, namely, filtering, cooling and filling, are carried out in an uninterrupted continuous manner, whereby the current of rarefied air required for the milking operation and for transporting milk through the system, can be effectively cleaned and disinfected at the time it penetrates into the system.

Yet another object of the present invention is the provision of suction-operated milking means of a milking apparatus which can be operated by a single conduit for the removal of milk and simultaneously guiding of a current of rarefied air.

A particular object of the invention is to construct the milk conduit at the milking means in such manner that individual milk currents flowing from the separate milking cups are united quickly and without friction, whereby a quick removal of milk is provided.

A still further object of the invention is the provision of means which will filter and disinfect the incoming outer air already at the milking means, so that there will be no danger of infecting the milk by contact with incoming barn air.

A yet further object of the present invention is the provision of a suction-operated milking apparatus of the described type which is provided with means introducing air flowing from the pulsator into the milk conduit horizontally in the direction of the flowing milk, so that the flow of the milk will be accelerated. This will also make it possible for the current of rarefied air to join the milk current safely and without friction.

A still further object of the present invention is the provision of special fittings for the suction-operated milking apparatus of the described type, which will secure within their range a free frictionless flow of milk and will thereby prevent any collection of milk residues or the joint whirling of milk currents which is damaging for the quality of the milk.

A further object of the present invention is to provide various devices, such as milk filters, cooling devices and filling devices for the various treating stages, which will be suitable for use in a suction-operated milking apparatus of the described type to provide at the same time an effective separation of the milk current from the current of rarefied air. The milk will then flow as the result of its own gravity through these devices and then, also by gravity, into the transporting cans. This will provide, on the one hand, an effective operation of the treating stages and, on the other hand, will secure a very careful treatment of the milk during these stages, and complete airtightness of the milk is secured.

It is also an object of the present invention to provide devices for filling milk into transporting containers wherein the milk is safely guided from an upper part of the transporting container to its bottom and whereby any movement of milk is terminated when the container is partly filled. Furthermore, the filling device prevents further flow of milk into a transporting container as soon as the latter has been filled to a predetermined extent.

and is conducted in the direction of the outflowing milk so as to precipitate the flow.

In the construction shown in FIGURE 7 the milk collecting pipe 101 constitutes a firmly connected single unit with its inclined upwardly extending milk inflow elements 101a and the pulsator 102. The interior 101b of the milk collecting pipe 101 is straight and smooth and is open on both sides to facilitate its cleaning. A valve 103 for the milk is inserted into the milk collecting pipe 101. The valve 103 has a tubular end piece 103b extending up to the front part of the pipe 101 and adapted to close in predetermined rotary positions to inflow from all four milk supplying elements 101a. The end 103b of the milk valve is massive and has slanting outer surfaces 103c which are introduced and fitted into the end 101c of the collecting pipe; if necessary, these surfaces can be correspondingly polished. A valve handle 103d is located at this end 103b of the valve and it extends perpendicularly downwardly when the valve 103 is open. The body of the handle carries a lock 103e which contacts the wall of the milk collecting pipe and which can engage in one position the lock 101d below the pipe 101 and, in another position the lock 101e at the upper side of the milk collecting pipe 101.

One side of the end 101c of the milk collecting pipe also carries an air inlet piece 104a which is connected by a hose 104 with the tubular joint 102a of the pulsator. An air filter 104b is located in the hose 104. There is an inclined bore in the massive valve end 103b, which extends from the air joint 104a through the valve and into the interior of the milk collecting pipe 101 when the valve 103 is in its operative position. In all other positions the inclined bore 103f is closed in relation to the pulsator 102.

The end of the hose 105 which is opposite the valve 103 is inserted into the pipe 101. An annular rubber seal 106 provides for an airtight connection.

An eyelet 107 is located under the pipe 101 and is used for hanging the device.

The milking means shown in FIG. 7 operates as follows:

Milk sucked from the teats flows into milk receivers 101a which extend obliquely upwardly and from there flows already in the direction of the general milk flow toward the milk conduit 105 into the milk gathering pipe 101 or into the inner span of the valve 103. The inclined direction of the milk receivers 101a prevents the development of any pressure in the milk current and provides a flow which is already directed in the general direction of the milk flow. During this milking process air flows in the form of separate impulses through the pulsator 102 and then through pieces 102a and through the air filter 104b located in an air hose 104, reaching the milk collecting pipe 101. The inclined bore 103f in the valve 103 conducts these air impulses in the direction of the general flow directly into the milk hose 105.

After the milking is completed, the valve 103 is turned to the extent of 90°. This will stop the supply of milk from the udders. The milking cups which are not shown in FIG. 7, can be easily removed from the udders. The turning of the valve 103 closes at the same time the connection of the pulsator with the milk collecting pipe. If there is any milk remaining there, it can not get to the pulsator.

In order to spray the milking means through the use of vacuum, the valve 103 with its handle 104d is turned completely upwardly. The connection between the pulsator 102 and the interior 101b of the milk collecting pipe still remains closed, but the milk inlets 101a are again opened. Thus spraying or cleaning water can be sucked in, but it will not reach the pulsator.

Should the milking device fall down as the result of being pushed by a cow or for other reasons, the handle 103d is so shaped that the valve will turn and that the milk inlets 101a will be closed. This prevents the inflow of barn air into the vacuum system or at least greatly diminishes this possibility.

The locking of the valve 103 in its three positions, namely, the milking position, the locking position and the suction position, can be effected by means of locks or small leaf springs. The milking device can be hanged by means of the eyelet 107 in the barn prior to its preparation for use or after it has been taken off.

A different embodiment of the milking means of the present invention is illustrated in FIGURES 8 to 12. An inventive feature of this invention is that as the milking cups drop off they are individually automatically switched off from the milk collecting pipe 201. In accordance with this embodiment the teat hose or milk inflow tubes 210 which are usually made of rubber, can be made of transparent yieldable plastic material.

In accordance with the simplest construction of these milking means, which is shown in FIGURES 8 to 12, the milk collecting pipe 201 carries upon its upper side four milk inflow holes 201a which extend obliquely upwardly. A container 210a of the transparent udder of milk inflow tube 210 is clamped upon the seat of each of the four holes 201a. Two rings 210a and thus two flexible tubes 210 are mounted behind a limiting ring 201i. A front stop ring 201k and a rear stop ring 201h prevent axial shifting relatively to the milk collecting pipe 201. The two lower limiting rings 201h and 201k cooperating with the middle stop ring 201i permit the four clamped members 210a a rotation only about the axis of the milk collecting pipe 201.

The milk transmitting hose 210 is made of transparent glass-clear plastic material. It has the customary form of test rubber; however, the opening 210b of the hose 210 is enclosed by a curved two-lipped member 210a. The diameter of the interior 210d of the flange member 210 is smaller than the outer diameter of the milk collecting pipe 201. The flange member 210a of the hose 210 firmly clamps the pipe 201 due to suitable selection of the material and the form.

An air separator or pulsator 202 is located upon the middle stop ring 201i of the milk collecting pipe 201; the pulsator can be attached at the end opposite to that of the hose 205, namely, at the front stop ring 201k to the milk collecting pipe 201.

The usual milking cups 210e are mounted at the enlarged upper end upon the milk transmitting flexible tubes 210.

The milk collecting pipe 201 terminates in the milk transmitting hose 205.

The milk collecting pipe 201 with four milk inlet bores 201a can be replaced by two milk collecting pipes which are located one next to the other and each of which is provided with two inlet bores. By this arrangement the diameter of the milk collecting pipe and thus the diameter of the clamped-on flanges of the milk transmitting tubes can be greatly diminished. The two milk collecting pipes will then end in a common main pipe which is attached to the milk hose 205. Then a construction results of the type shown in FIG. 13.

The operation of the milking means shown in FIGS. 8 to 12 is as follows:

Prior to the milking the flanges 210a of the four milk transmitting tubes 210 are clamped upon the milk collecting pipe 201, two of them being attached in front of the middle stop ring 201i, while two are attached behind that ring. The hose 205 connects the milking means with the removing suction conduit. Prior to the milking the milking cups pull the tubes 210 downwardly due to their weight, so that the flanges 210a will be also turned downwardly, as shown in FIG. 10. One lip of the flange 210a will then close the milk inlet bore 201a. The collecting pipe is sealed against outside air, so that the required milking vacuum can be produced. When the milking cups 210e are placed upon the teats, the latter are raised and thus the flange 210a upon the pipe 201 is rotated until the opening 210b is brought into registry with the inlet hole 201a, so that the suction effect of vacuum can be exerted upon the teats. Milk is then sucked off and the amount of flow produced by each teat can be seen through the transparent pipes 210. In the case of a "three teat" cow one of the four milking cups can be allowed to hang downwardly. The flange of this cup will then close the inflow hole. If the milking means are dropped during the milking by a movement of the cow or for other reasons, the flanges 210a will rotate automatically about the axis of the milk collecting pipe 201 and will close the inlet bores 201a. Thus the milking means when lying on the ground can not suck in any dirt. This automatically operating locking procedure prevents at the same time the penetration of barn air into the milking system, which could otherwise cause other milking means to drop off due to insufficient vacuum.

When the milking of a cow has been completed, the milk cups 210e with their tubes are removed from its teats and are then dropped downwardly. The automatic turning of the flange 210a upon the pipe 201 will again close the milk inlet holes 201a.

After the milking the flanges 201a of the tubes 210 are removed from the pipe 201 and all parts which have come in contact with the milk are cleaned separately.

A third construction of the milking means is shown in FIGURES 13 and 14. This construction, as well as the previously described second construction with transparent teat tubes and the automatic switching off of each teat tube can be constructed so as to involve a turning relatively to the milk collecting pipe. This construction of the milking means provides, furthermore, the possibility of having a smaller diameter for those parts of the milk collecting pipe which are enclosed by the flanges of the teat tubes, and at the same time to provide the milk collecting pipe itself with the first milk filter. This construction also facilitates the relative arrangement of the teat tubes so that they can be easily and effectively adapted to the structure of the udder of a cow.

As shown in FIGURES 13 and 14, the milk collecting pipe 301 serves at the same time as a container for the filter frame 308 which is enclosed by a cotton disc and is mounted upon the end of a milk transmitting tube or hose 305. The two ends of the milk collecting pipe 301 are closed airtightly by rubber seals 306 and 306a. At one side of the milk collecting pipe there are two inclined inlet pipe pieces 301m, each of which is provided with two inclined inlet bores 301a which are open at the top. A conical limiting piece 301n is mounted upon an end of the members 301m. A separate air hose 304 provided with an air filter, is inserted into each open end of the pieces 301m, the two hose or tubes 304 being connected with the air flow flanges 302a of the pulsator 302.

The pulsator 302 is attached to the milk collecting pipe 301 between the two milk inlet flanges 301m. The members 301m are provided at the lowermost point of the milk collecting pipe 301.

The operation of these milking means is essentially the same as that of the above described second constructional embodiment.

The milk filter additionally provided in this embodiment is sealed in relation to the sealing member 306a of the pipe 301, in that the filter casing 308 carries at this end a connection piece 308b, by means of which the cotton disc of the filter is firmly pressed against the inner surface of the milk collecting pipe. The end of the filter frame 308 which is directed toward the milk hose 305 is provided with a sleeve-like enlarged part 308a which is mounted upon the outer surface of the milk hose 305.

The operation of the filter is as follows:

FIGURE 15 shows the first filter which can be used for all three above-described embodiments of the milking means. However, in the illustration of FIG. 15 the milk collecting pipe is shown as it was illustrated in FIG. 7, being provided with a milk outlet valve. However, the arrangement of the filter will be simplified if instead of being arranged in the longitudinal bore hole of the valve body, it would be located directly within the walls of the milk collecting pipe, as is illustrated, for example, in FIGURES 13 and 14.

In prior art, the first milk filter was inserted as a separate structural element into the milk conduit. The milk conduit had to be interrupted and this resulted in substantial difficulties in cleaning the milk hose as well as the filter itself and, furthermore, resulted in a substantial interruption of a smooth milk flow, since milk used to collect in the hose in front of the filter. Such prior art filters are particularly detrimental in a milk-suction apparatus with a single conduit for the current of milk and a current of rarefied air, since they present a substantial resistance to the flow of rarefied air as well, so that it could easily happen that there would not be the vacuum at the milking means which is necessary for their operation. A milk filter inserted into a milk conduit is, therefore, often the cause for the dropping off of the milking cup.

Another drawback of prior art filters inserted into the milk conduit is that milk already gives up a part of its warmth during the flow through the milk hose from the milking means to the filter, so that it is much more difficult to filter it than the milk which has still preserved the warmth of the cow.

As compared to prior art the first filter of the present invention which will be described hereinafter, has the following advantage:

The milked milk is filtered immediately, while it still has the body heat of the cow, prior to its entry into the milk hose.

In this first filter the filter carrier may consists of a non-rusting steel spring or a tubular plastic cage. In the example shown in FIG. 15 the filter carrier 108 consists of a plastic cage. One end of the filter carrier 108 has a larger diameter which is equal to the outer diameter of the filter hose 105. The filter is mounted upon the milk hose 105 by means of a filter carrying insert 108a. In the embodiment of FIG. 15 the central piece of the filter carrier 108 extends into the central axis bore of the valve body 103 and is provided at its free end with a joint 108b which presses lightly and resiliently against the inner wall of the valve body 103.

In milking devices which do not have a valve of this type the central piece of the filter carrier 108 projects into the interior of the milk collecting pipe 201 (FIGS. 8 to 12) or 301 (FIGS. 13 and 14), whereby the joint 108b presses then lightly and elastically against the inner wall of the milk collecting pipe itself.

The cotton disc 109 is wound about the filter carrier 108 and is folded inwardly at its two ends 108a and 108b. The seal is produced, firstly, by the seat upon the end of the hose 105 and, secondly, by the resilient engagement with the inner wall of the milk collecting pipe 201 or 301, or with the inner surface of the axial bore of the body of the valve 103.

The first filter operates as follows:

Milk sucked off the teats flows through the passages 101a of the milk collecting pipe 101 into the interior of the pipe. Following the air current and the direction of the pressure drop, milk is sucked through the cotton disc 109 wound around the filter carrier 108 and then passes from the interior of the filter into the milk hose 105. During this procedure all dirt and other extraneous particles remain at the outer covering of the cotton disc. The central part of the cotton disc 109 is the one which participates substantially exclusively in the filtering operation. That part of the cotton disc 109 which is within the range of the resilient end 108b remains substantially unused and, consequently, free from dirt and flakes to a great extent. The suction current can pass through this part of the cotton disc even if the milk flow is impeded by a filled up sieve. Thus, the milk cups continue to adhere to the teats. However, the filter provides a good passage for a long time since the milk current emerging from the central part of the filter always passes through those parts of the filter which present the least resistance.

The bottom disc 109 can be easily exchanged by pulling the hose 105 out of the milk collecting pipe 101 and then removing the dirtied cotton disc 109. Then the filter carrier 108 is wound with a fresh cotton disc 109 and is again pushed upon the end of the hose 105, whereupon it is introduced jointly with the hose into the milk collecting pipe 101.

*Milk withdrawing conduits B* (FIGS. 1 to 6 and 16 to 18).—The basic diagram of FIG. 1, which shows a milking apparatus of the present invention, can be also used for larger stationary installations, wherein the milk conduit is mounted above the animals in the barn as a rigid piping. This rigid mounting of the milk conduit will be described hereinafter with reference to examples shown in FIGS. 2 to 4. Another arrangement which is particularly suitable for smaller units, consists in that the milk conduit B is made flexible in the form of a hose and is guided by means of supporting hooks in the barn to the desired location. This last-mentioned construction can be combined with a stationary mounting for the receiving and filling station C and the milking aggregate D. However, it is also within the scope of the present invention to provide a movable receiving and filling station C and a movable milking aggregate.

A very important advantage of all these constructions of the milk conduit B is that there is an uninterrupted passage for the milk from the udder of the cow to the milk can or transporting container. The milk received therein has been filtered and is ready to be transported.

When a rigidly mounted milk conduit 117 is used, as illustrated in FIGS. 2 to 4, the conduit extends from the milk chamber 123 parallel to the longitudinal axis of the barn, i.e. perpendicularly to the cow stalls 118. This first length of the milk conduit 117 is guided over the second or third cow along each stall row 118 and at the last cleaning passage 119 is guided in an arc along this passage 119 and at the end thereof is guided back also parallel to the longitudinal axis of the barn over the second-last or third-last cow of each row 118. The conduit is returned to the milk chamber in the middle of the first passage 119a. This arrangement of the milk conduit 117, shown in FIG. 2 can be carried out particularly effectively when each row 118 is provided for eight to ten animals.

However, the arrangement shown in FIG. 2 can be also carried out effectively when there are twelve animals in each row 118. In that case the milk conduit 117 is conducted over the third cow or between the third and the fourth cow, while the opposite conduit extends over the eighth and ninth cow.

In both types of structures there is a pair of valves at each location wherein the lengths of the milk conduit 117 extend across the passages 119. From there five to six animals are milked from the same valve. As shown in FIG. 4, the hose 105 of the milking device A is then held high in the middle by a holder 112a which slides upon a wire 112. This holder can be shifted along the wire 112 whenever necessary.

In the case of barns having more than twelve animals in a row, it is advisable to guide the conduit 117 once again rearwardly along the barn axis, so that a third section of the pipe is guided over the central animals of each row. The return conduit 121, which may be also designated as a spraying conduit, extends from the end of the conduit 117 in an arc 124 directly to the milk chamber 123.

With this guiding of the pipe 117, the milking procedure is determined by the valves 115 arranged in pairs over the passage 119. The operator can connect thereto two separate milking devices and milk ten to twelve animals without further hose connections. The length of the hose and the support in the middle of the hose 105 make it possible for him to milk easily even those animals which are located far away from him. Prior to starting and after the milking, the milking device is always hung upon the wire 112 by its eyelet, so that there is no danger that it may be dirtied.

In the constructions of FIGS. 5 and 6, which represent installations for smaller units, the milk conduit B is provided by the milk conducting hose 105. The milking device A for such units is provided with a valve 103 and a first milk filter 108 within the milk collecting pipe 101, as has been described already. A particularly long flexible tube 105 serving as the milk conduit extends from the milk collecting pipe 101 to the milk receiving and filling device C which is connected with the covers 130 of milk transporting cans 122 or with a milk collecting container. In order to bridge without impediments the distance between the cow and the milk chamber, or the location of the transporting cans 122, or the milk collecting container, the hose 105 is guided in the barn upon a hook 111 or along a wire. If the milking aggregate is located in a milk chamber which is separate from the barn, then a passage 113, 114 provided with inner sleeves is provided in the wall between the barn and the milk chamber. The inner sleeve 114 prevents damage to the walls of the hose 105. A connecting hose 131 extends in that case from the filling device C or the cover 147 of collecting container 148 to a vacuum pump or to the vacuum container of the milking aggregate D.

If the milking takes place in conjunction with a collecting container 148, as illustrated in FIG. 6, the hose 105 serving as a milk conduit B is guided in the barn in the above-described manner and as illustrated in FIG. 5. However, the hose 105 ends then in a milk receiving and milk treating device C, which is built into the cover 147 of the collecting container 148. For that purpose there is provided an inwardly curved sieve 146 located in the cover 147 under the inlet of the hose 105. This sieve 146 can be provided in the usual manner with a cotton filter disc 109. Furthermore, the cover 147 of the collecting vessel 148 carries a flange for attaching the vacuum hose 131, a vacuum device 139 and a reduction valve 138. The collecting container 148 can be mounted upon a carriage 149 along with the milking aggregate D and thus can be transported to a ramp of the building, or the like.

During operation the hose 105 in the milk chamber is connected with the milk receiving and filling device C and is guided through the protected passage 113, 114 from the milk chamber into the barn. In the barn the milking device A is attached to the other end of the hose 105 and the valve is closed. When the milking aggregate D has been switched on, the hose can be drawn over the first hook 111 in the barn and the milking device A can be attached to the first cow. The operator proceeds in this manner from cow to cow. When a wire is provided for the guiding of the hose 105, then prior to the milking all the hose hooks are hooked onto the wire and the mounted hose 105 is moved along the row of cows as required. A corresponding procedure is also used when milking into the collecting container 148.

If the installations shown in FIGS. 5 and 6 are to be used for milking two cows at the same time, it is possible to mount a T-fitting at the end of the hose 105 serving as a milk conduit, from which a separate connecting hose will extend to each milking device A.

When more than two milking devices are to be used in the installation of FIGS. 5 or 6, and when milking apparatus according to FIGS. 2 to 4 is to be used, it is advisable to employ a sub-pressure closure which will be described in detail hereinafter.

This sub-pressure closure primarily eliminates corners and dead spaces in the milk conduit B, which would facilitate the settling of milk residues and thereby cause a substantial diminution in the durability of the milk. As compared to prior art constructions wherein milk currents and sub-pressure air currents were joined at right angles to each other, particularly as far as prior art T-joints are concerned, the sub-pressure closure described hereinafter provides a joining of partial currents of milk and subatmospheric air which is technically correct; developments of butter which were heretofore unavoidable and which diminish the quality of the milk, do not take place any more. On the contrary, the sub-pressure closure due to its technically correct structure guides the milk directly and without shocks into its direction of the outflow.

In addition, the sub-pressure closure which is described hereinafter can be mounted extremely easily and can be removed by a single grip, so that it is possible to clean it often and thoroughly without any difficulty. Furthermore, the manufacture of this closure is uncomparably cheaper than the manufacture of all prior art armatures.

All these advantages are attained by the sub-pressure closure 115 which will be described in detail hereinafter, by providing a bore hole extending obliquely to the outflow direction of the milk in the wall of the milk conducting pipe 117 or the hose 105 and clamping a sleeve-like holder 116c having an inclined closing tubular piece 115a over the bore hole 117b upon the pipe 117 or the hose 105. By turning this sleeve 115c coaxially relatively to the pipe 117 or the hose 105, the closure is either opened or closed. If for reasons of safety, in the constructions shown in FIGS. 5 and 6, it is desired to avoid placing the sleeve 115c directly upon the flexible hose 105, it is possible to mount a sleeve made of thin metal sheet and having a bore hole corresponding to the hole in the hose 105 upon the outer surface of the hose 105 within the range of the closure 115. Furthermore, in the constructions of FIGS. 5 and 6 it is possible to mount a divider consisting of a short rigid tubular piece upon that end of the hose 105 serving as milk conduit which is directed toward the milking means A, the divider being provided with the corresponding bore holes 117 and carrying the corresponding closures 115.

FIGURES 16 to 18 show a constructional embodiment of the closure wherein a limiting ring 116 is mounted upon the pipe 117 which conducts air and milk, adjacent the inflow hole 117b. The limiting arm 116b extends at a predetermined angle to the inflow hole 117b, since the arm 116b determines the open position of the closure 115. The closure 115 consists of a sleeve-like body 115c of a plastic material or rubber, the inner diameter of the body 115c being smaller than the outer diameter of the enclosed pipe 117, or of the enclosed hose or the like. The closure 115 is clamped with its sleeve-like member 115c upon the pipe 117 adjacent the limiting ring 116 and is held thereon by its own metal tension or by the vacuum in the conduit 117. In the locking position, the closure covers with a lip of its member 115c the inflow hole 117b and as the result of its own tension and outer pressure, provides an air-tight closure. The member 115c is connected with an inclined tubular joint 115a. The outlet opening 115d of the member 115a coincides with the inflow hole 117b when the sleeve 115c is turned upon the conduit 117. Thus in the open position the joint 115 engages the stop 116b of the limiting ring 116.

The operation of the closure 115 is as follows:

The sleeve 115c is clamped upon the pipe 117 adjacent the limiting ring 116. The sleeve 115c is then so turned that the connecting joint 115a extends upwardly. Then the inflow hole 117b is closed by a lip of the sleeve 115c. The milk hose 105 or a connecting hose is inserted into the joint 115a until it strikes the conduit 117. The channel 115e of the joint 115a is conical, diminishing continuously from the mouth piece 115b to the inlet opening 115d. This narrowing of the channel 115e of the joint 115a provides an airtight connection with the inserted hose 105. Then the sleeve 115c is turned along with the hose 105 relatively to the conduit 117, until the outflow opening 115d of the joint 115a coincides with the inflow hole 117b of the pipe 117. The joint 115a has then moved into contact with the the stop 116b of the limiting ring 116. The valve 115 is then open and milk can flow into the main pipe 117B. Due to the inclination of the joint 115a milk flows smoothly without being subjected to shocks into the conduit. Upon completion of the milking operation the sleeve 115c is again turned upwardly. Then the inflow hole 117b of the conduit 117 is closed again. The hose 105 can be then pulled out of the joint 115a.

If it is desired to clean thoroughly the conduit 117 or the hose used as the milk conduit and provided with the closures 115 of the described type, then the closures can be removed with a few pulling motions out of the conduit 117. The limiting rings remain in their positions, since they do not come in contact with the milk. Then the closures 115 can be cleaned from all milk residues separately from the conduit 117.

It is also easily possible to provide closures of this type upon the milk conduit B at other places than at the connecting points of the hose 105. For example, FIG. 1 shows such a closure 115 used for connecting to the milk conduit B a disinfection conduit 142e which will be described later on.

*Second milk filter, cooling and filling devices C* (FIGS. 19 to 22).—Heretofore, the customary procedure was to collect the milk gathered by suction in conduits in a barn, in a collecting pot at the bottom of which, or at half the depth of which, there was a double perforated disc with a cotton filter. Milk passed through the cotton filter by gravity and due to the action of vacuum, and was thereby cleaned of dirt particles. From there milk was collected in a first transporting can and when that was filled the milk was gathered in the next can by means of an overflow tube until that also was filled. This was continued until the last can. Such a treatment of milk after milking has the following substantial drawbacks:

(1) During the filtering the cotton disc is too strongly affected by the vacuum, so that milk passes through the filter not only due to its own weight but essentially as the result of suction. It was found necessary, therefore, to employ special expensive cotton discs of strengthened construction, or to provide the filter with special vacuum-compensating devices. Such devices occupy a comparatively large amount of space and are quite expensive in manufacture. Furthermore, they break easily and, therefore, can not be recommended for a raw milking treatment.

(2) The filling operation with a battery of cans is carried out by means of many connecting pieces and overflow conduits which require a substantial amount of daily cleaning. Each can requires a special filling cover with two connecting pieces and is comparatively expensive.

(3) In prior art filling devices milk continues to flow during the entire milking procedure and comes to rest only after the removal of the last milking cup. This extensive movement of milk while it is subject to vacuum, causes the development of butter and diminishes the quality of the milk.

Heretofore, particular difficulties were experienced with the cooling of milk which up to now took place in transporting cans. For that purpose the cans were sprayed with cold water in a walled-in space, so as to remove the warmth of the cow from the milk. This type of cooling has the following substantial drawbacks:

(1) The cooling of milk which is at rest, proceeds only very slowly.

(2) The transporting vessels are substantially damaged in the course of time by the cooling water.

(3) The additionally required cooling spaces not only necessitate substantial manufacturing costs, but are essentially a nuisance in the milk chambers since they require a great deal of space.

Attempts have been made to eliminate these drawbacks by cooling the milk in the first can by a suspension device while the milk was still flowing. These devices were not found to be adequate in actual practice.

As compared to prior art, the present invention provides a second milk filtering, cooling and filling, which can be introduced into the milk flow without disturbing it, and which will securely provide that the milk, as soon as it fills a transporting vessel, is finally and completely ready for transportation. Milk can come to rest in the transporting container as soon as it has filled it, so that no detrimental influences are possible any more. Thus, as will be described in detail hereinafter, the present invention has provided the possibility of filtering milk while excluding air while milk is still warm and to cool the milk immediately following the second filtering while excluding air before the milk fills the transporting containers.

The filter device of the present invention which is described hereinafter is independent from the air current of the vacuum container, so that the milk passes through the cotton disc solely under the action of its own weight. Therefore, it is possible to use the same filtering material, as was satisfactorily practiced heretofore for milk filtering with open filters. At the same time the formation of foam is substantially prevented, and rarefied air which is conducted along with the milk in the same conduit is separated prior to the filtering. It is thus possible to construct filters having particularly good filtering properties.

As is shown in FIGS. 1 and 19, the conduit B extends from above into a collecting container 125 from the upper part of which leads the vacuum conduit 131, while milk is withdrawn at the bottom of the container 125.

As shown in FIGS. 19 and 22, the second filter is actually located within the container 125.

For that purpose the bottom of the container 125 is shaped as a filter base plate 125c. The outer walls of the container 125 constitute the filter tube 125b. Within a filter tube 125b which is mounted upon the filter base plate 125c, there is located a cylindrical filter cage 125a the lower part of which extends over the outflow hole 125g provided in the base plate 125c. The cage is mounted in a special depression which holds it firmly and which, along with the cage presses the cotton disc against the lower filter edge. The cotton disc thus extends as a cover over the cage 125a and is held at its upper edge by a clamping ring 125h. The cover 125d of the collecting container 125 serving as the filter casing, has two inlets, namely, an inlet 125f for introducing the conduit B and a second opening 125e for introducing the suction conduit 131. Since rarefied air is separated from the milk in the upper part of the container 125, this separating process is apart from the filtering process. The conduit B is inserted deeply into the collecting container 125 and extends closely to its bottom 125c. This end of the conduit B which extends perpendicularly inside the container 125, is cut obliquely at the bottom and is provided with a longitudinal slit 105a which terminates on top in an air hole 105b located under the cover 125d.

The filter operates as follows:

Milk withdrawn by suction in the barn flows through the conduit B into the filter casing and is conducted to the bottom of this casing, so as to diminish the formation of foam to the greatest possible extent. Rarefied air which was also conducted by the conduit B is removed at the upper part of the end of the conduit through the slit 105a and the hole 195b. Milk separated from air seeps through the cotton disc in the lower end of the casing by its own gravity, said cotton disc having been wound around the cage 125a. Then the milk runs again by gravity from the interior of the cage 125a through the opening 125g in the plate 125c and into the filling device.

In the filling device which will be described in detail hereinafter, the milk flows from the filter casing without contacting again the rarefied air of the vacuum aggregate by gravity into a separating pipe and thence into transporting containers, whereby each transporting container is filled independently of the others, the milk coming immediately to rest as soon as it has filled a container.

As shown in FIGURES 1, 19 and 22, a wide milk filling hose 128 extends from the filtering device 125, or the cooling device 127, into a distributing pipe 129 which has an even greater diameter, or into a distributing hose which is also wider than the hose 128. The distributing pipe 129 (or the distributing hose) is connected either directly or through short flexible tubes with the covers 130 for the milk transporting cans 122. In accordance with a preferred embodiment, small connecting pieces 129b are provided which extend to the individual cans 122. When the distributor 129 has the form of a flexible hose, this function is assumed by the outflow openings 129c.

To provide a close and direct airtight connection between the distributing hose 129 and the covers 130, each cover 130 carries a clamp 130b which presses firmly the distributing hose 129 upon the connections 130c of the filling pipe 130a which extend a few millimeters beyond the cover 130. A sealing ring 130d extends around the connections 130c above the cover 130 to provide better sealing. The can-filling tube 130a extends obliquely under the cover 130 and ends at a wall of the can 122 used for transporting the milk. The distributing pipe 129 is closed at the end of the battery of cans with a plug 129a.

The above described filling device operates as follows:

Milk flowing out of the filtering device 125 reaches the distributing pipe 129 through the hose 128. Due to its cohesion, milk will be in engagement with the inner surfaces of the hose or the pipe and thus will produce a return flow of air which was caused to leave the cans. Milk flows through the joints 129b or the openings 129c and through the filling pipe 130a into the cans 122. Due to the inclination of the pipe 130a milk must flow along the walls of the cans, so that formation of foam and any excessive movement of milk are avoided. When the can is filled up to its neck the inclined outlet of the filling joint 130a is closed. No more air can escape upwardly out of the can and the inflowing milk fills only the connection 130a. As soon as it is filled, the milk following hereafter can go only to the next inflow openings, i.e., to the next cans. Milk has reached its final state of rest in the filled cans. After the milking, the distributing pipe 129 is separated from the battery of cans, the described can covers are removed and are replaced by ordinary can covers used when the cans are being transported. After the removal of the filling covers 130 the remainder of the milk which was located in the small filling pipe 130a, flows also into the can, so that the level of the milk in each can reaches its final stage and each can is properly filled.

Should it be necessary to fill larger amounts of milk in this manner, then it is advisable to provide in the filter ground plate 125c two or three outlets which are then connected with two or three batteries of cans. The passage of the filling hose 128 must be always of such size, that the outflowing milk leaves enough space for the escape of the returning air.

Should it be desirable to cool the milk prior to its distribution in the containers 122, then it is advisable to use a combined filtering and cooling device shown in FIG. 22. The construction of the filtering device 125 remains then substantially the same as that described in connection with FIG. 19. However, a double walled, cylindrical milk cooler 127 which is round at the bottom, is then attached from the bottom to the filter base plate 225c. The inner space 127a between the two walls of the cooler 127 has at the bottom an inflow joint 127c and at the top an outflow joint 127b for the cooling medium. A distributor 126 having a spiral outer covering is located within the cooler 127 and has ribs 126b engaging the wall 127d of the cooler. The distributor 126 is hollow and carries on top an air withdrawing tube 126a which extends through the outflow opening of the filter base plate 225c. The rounded lower part of the cooler carries a milk outlet 127e which is connected with the filling device.

This milk cooler operates as follows:

Milk seeping through the milk filter 125a passes by gravity through the outflow hole of the filter base plate 225c and reaches the interior of the milk cooler 127. From there it arrives at the upper part of the divider 126. Due to the form of this divider or distributor milk moves to the cooling wall 127d. Contrary to the arrangement in prior art coolers wherein milk was flowing directly to the outlet opening, in accordance with the present invention the spiral ribs 126b cause the milk to flow downwardly in spirals along the inner wall of the cooler. The cooling medium is supplied in the usual manner, namely, the space between the two walls of the cooler 127 is supplied from the bottom with the cooling medium, such as ice water. Thus the cooling takes place in counter current.

The milk flows through the outlet 127e into the cans 122 or the filling device 129. Rarefied air is pressed upwardly out of the space in the cans 122 as this space is being filled with the milk; air flows in counter-current to the milk through the air outlet passage 126a within the filter casing and then is sucked through the suction joint 131 into the vacuum pump.

The cleaning of the cooling device can take place very easily. After the removal of the filter base plate 225c and after having taken out the distributor 126, the interior of the cooler can be easily scavenged and cleaned.

*Milking aggregate with warm water supply and disinfection device D (FIGS. 23 to 25).*—One of the most unpleasant drawbacks of prior art suction-operated milking devices was that there was no sufficient warm water available for the thorough removal of fat residues from the conduit while cleaning after the milking. Practical experience has also shown that the residue effects are more pronounced in suction-operated devices which sometimes produce milk of poorer quality. Therefore, attempts were made in many installations to replace the lacking warm water by an extensive use of disinfectants to provide a thorough cleaning. However, despite good disinfection lactic acid residues are formed which can be deposited in various parts of the installation with a most detrimental effect. Furthermore, the use of strong disinfectants will affect the outer surfaces of parts made of rubber and plastic and used in the milking apparatus, whereby these parts lose their smoothness and thus facilitate the depositing of milk residues.

Since in many installations operated in the country it is not possible to provide an additional supply of warm water in the milking chamber, an important feature of the present invention is to utilize the compression heat and the heat inherent in the sucked-off air for producing warm water. Furthermore, the milking aggregate described hereinafter can greatly facilitates the disinfection of the installation, since the vacuum housing of the milking aggregate is constructed at the same time as a lye container. This combination of warm water heater and disinfecting device with the milking aggregate constitutes not only a simplification in the construction and assembly of the apparatus, but also greatly simplifies the cleaning and the disinfection of the apparatus. Since the task of cleaning and disinfecting is so greatly simplified, it will not be carried out sloppily as a rule, so that the cleanliness required for milking apparatus can be much more easily maintained than heretofore. The milking aggregates described hereinafter have the following particular advantages:

(1) Conduit water is heated by compression heat and can be used for cleaning purposes, particularly for the removal of fat residues from the apparatus.

(2) The heat of the capped slide compressor, which is used quite often, is considerably diminished by contact with water. Thus detrimental effects upon the motor are avoided to a great extent.

(3) The noise of the pump which is often unpleasantly noticeable during milking, is substantially diminished by the water surrounding the pump.

(4) It is not necessary to provide a separate warm water container.

(5) Compressor heat which may be undesirable in the milking chamber, is absorbed in this manner and can be usefully utilized.

(6) There is a saving of special containers for the sprayed lye (for the conduit) and for the disinfection devices.

Figure 23:
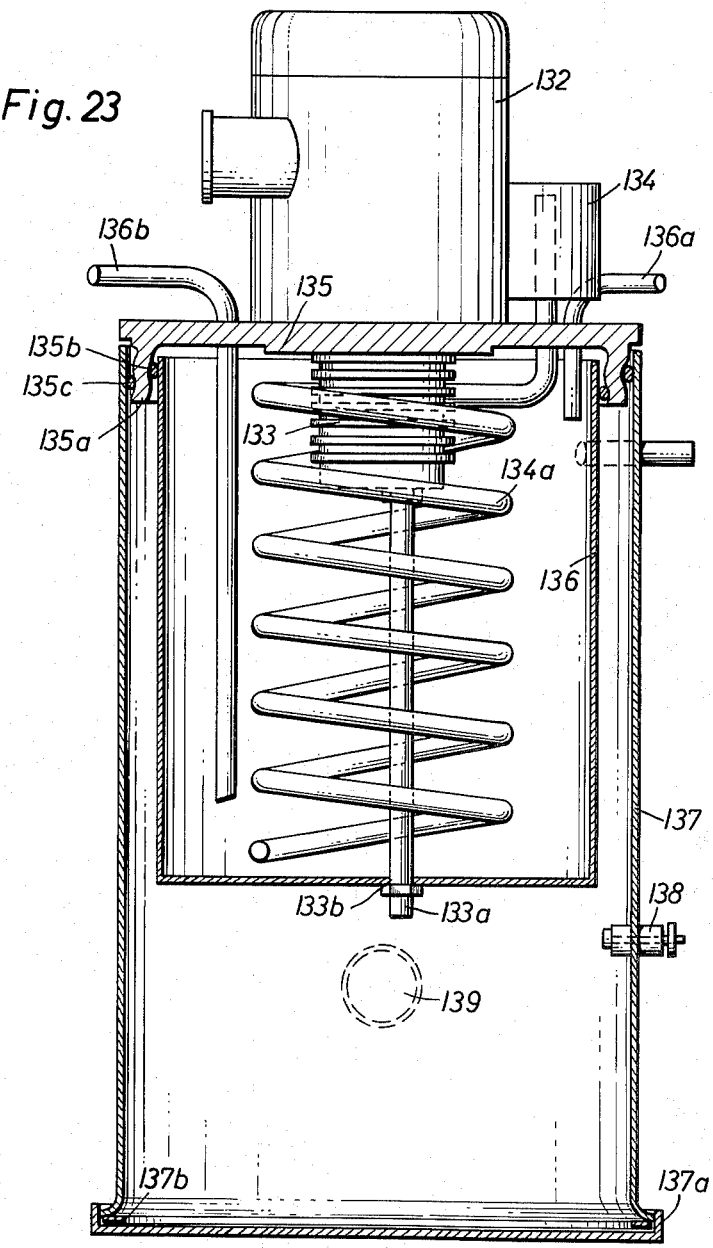

As shown in FIGS. 23 to 25, the air compressor is enclosed by a water container which is connected through a ground plate directly with the domestic water supply. The water in this container receives the compression heat. The under-pressure container faces this water container and encloses it; the under-pressure container also contains in the lower one third of its space lye for the disinfection of the milking means and of the conduit. The under-pressure container serves at the same time as an insulating covering for the warm water container.

A saucer-like or oval base plate 135 is inserted between the driving motor 132 and the vacuum pump 133 and has an inner edge 135a holding the warm water container 136. The water container 136 is also held in its position by the screw 133b. Water supplying pipe 136b leads into the container 136 through the plate 135 while warm water is conducted out of the container 136 through the conduit 136a. The vacuum pump which projects centrally into the container 136, sucks air out of the vacuum container 137 through a long suction tube 133a. At the same time the pump ejects the sucked-in and compressed air through an extended exhaust conduit 134a to the exhaust dash pot 134.

The vacuum container 137 encloses the warm water container like a cover and is also mounted upon the base plate 135. A reduction valve 138 and a vacuum measuring instrument 139 are mounted upon the vacuum container 137. As shown in FIGS. 24 and 25, the under-pressure container 137 may be oval in cross section; the lower one-third of this container may be filled with disinfection lye which can be transmitted through an outlet 142c, a conduit 142e with a closure valve 142d and a sub-pressure closure 115 shown in FIG. 1, into the tubular conduits B of the apparatus. Furthermore, a row of tubular pieces 142a is located upon the under side of the vacuum container 137; the tubular pieces 142a may be connected with the interior of the container 137 which is filled with the disinfection lye through a special valve having a body 142b. As shown in FIGS. 1 and 24, the milking elements A having the flexible tubes 105 are attached to the pieces 142a. The milking elements with their cups 210e are hung upon hangers 144. The conduit 141 for the domestic water is connected with warm water outlet 136a through the mixing battery 141b and the valves 141c and 141a, and is guided through the outlet 141d to the tubular conduit of the apparatus. The mixing battery 141b is mounted above a washing basin 145.

The milking aggregate operates as follows:

When it is in operation, it sucks in air from the conduit system and thus creates the vacuum required for the milking. Air is sucked in from the vacuum container, is compressed in the pump 133 and is expelled through the exhaust 134a and the dash pot 134. The rotating parts of the pump produce heat during compression by their friction. At the same time heat is developed in the air during its compression. This heat is transmitted outwardly, on the one hand, by the outer walls of the pump 133 which are preferably provided with ribs, and, on the other hand, is transmitted by the spiral exhaust pipe 134 to the water in the container 136.

The warm water container is always connected with the water pressure system of the domestic water conduit by the pipe 136b. Therefore, the container is filled with water and transmits pressure through the outlet pipe 136a to the removal points or to the mixing battery 141b. Water in the container will be heated to a greater or lesser degree depending upon the duration of the operation of the pump. At the same time vacuum prevailing in the container 137 will provide an outwardly effective heat insulation.

After the completion of the milking operation the cold water of the domestic cold water conduit 141 is conducted through the pipe B. Thus milk and albumen residues are removed. Thereupon, the valve 141a is actuated to close the domestic water conduit and water heated by the compressor is allowed to flow through the conduit B and thus to remove the fat residues. The cleaning of the conduit is then completed. In order to disinfect the conduit B, the milk transmitting conduit is connected to the disinfection conduit 142e by the sub-pressure closure 115, and the valve 142d is opened. Then the lye will flow out of the container 137 into the conduit system where it will be allowed to remain until the next milking operation.

The suction milking elements A which were initially cleaned in the basin 145, are then hanged up on the hanger device 144 along with the milking cups 210e. The milk hose 105 of the milking device A is then connected to one of the connection pieces 142a. Then the valve 142b is opened and the lye passes through the milk hose 105 into the milking device A and rises in the milking containers up to the upper edge. The milking element or elements remain in this condition until the next milking.

When the next milking operation begins, the aggregate is first set. The vacuum will suck in again the lye out of the milking elements A and out of the conduit B through the disinfection conduit 142e. The valve 142b and 142d are closed and the sub-pressure connection 115 of the disinfection conduit 142 is connected to the suction milk conduit B, whereupon the entire apparatus is ready for the milking operation. If desired, however, the apparatus can be scavenged once again with clear water.

It is apparent that the embodiments of the invention which have been described above, have been given by way of illustration and not by way of limitation and that they are capable of many variations and modifications within the basic scope of the invention and within the scope of the appended claims.

What is claimed is:

1. In a milking apparatus, a milk suction claw device, comprising a milk collecting pipe, a milk transmitting hose having one end connected with one end of said collecting pipe, a rubber seal enclosing the other end of said collecting pipe, two spaced inlet pipe pieces having ends connected with said collecting pipe, said inlet pipe pieces being inclined relatively to said collecting pipe, an air hose interconnecting other ends of said inlet pipe pieces, a pulsator mounted upon said collecting pipe and communicating with the interior of said air hose intermediate the ends thereof, and teat cup connecting pipes carried by said inlet pipe pieces and communicating with the interiors thereof intermediate the ends of the inlet pipe pieces.

2. A milking apparatus in accordance with claim 1, further comprising a filter, said filter comprising a cage-like filter frame, a cotton sheet enclosing said filter frame, said filter frame and said cotton sheet being located within said collecting pipe, said cotton sheet extending over the openings of said inlet pipe pieces, and an insert connected with said filter frame and engaging said end of the transmitting hose for mounting the filter upon said end of the transmitting hose, said filter frame having a joint resiliently pressing against an inner wall of said collecting pipe.

References Cited by the Examiner
UNITED STATES PATENTS

| | | | |
|---|---|---|---|
| 828,613 | 8/1906 | Lane | 119—14.36 |
| 1,144,380 | 6/1915 | Rackstraw | 119—14.55 |
| 1,358,676 | 11/1920 | Young et al. | 119—14.55 |
| 2,380,771 | 7/1945 | McDonald | 141—35 |
| 2,460,426 | 2/1949 | Maes | 119—14.37 |
| 2,674,979 | 4/1954 | Merritt et al. | 119—14.05 |
| 2,779,308 | 1/1957 | Gallistel | 119—14.18 |
| 2,878,819 | 3/1959 | Thomas | 134—57 |
| 2,896,574 | 7/1959 | Larsen | 119—14.54 |
| 3,072,096 | 1/1963 | Kluge | 119—14.54 |

FOREIGN PATENTS

| | | |
|---|---|---|
| 1,026,567 | 3/1958 | Germany. |
| 340,599 | 1/1931 | Great Britain. |

ABRAHAM G. STONE, *Primary Examiner.*

CHARLES W. ROBINSON, ANTONIO F. GUIDA, T. GRAHAM CRAVER, *Examiners.*

Feb. 8, 1966           G. VENCA           3,233,590
METHOD AND APPARATUS FOR FEEDING GERMINATED GRAIN
Filed Jan. 27, 1964           3 Sheets-Sheet 1
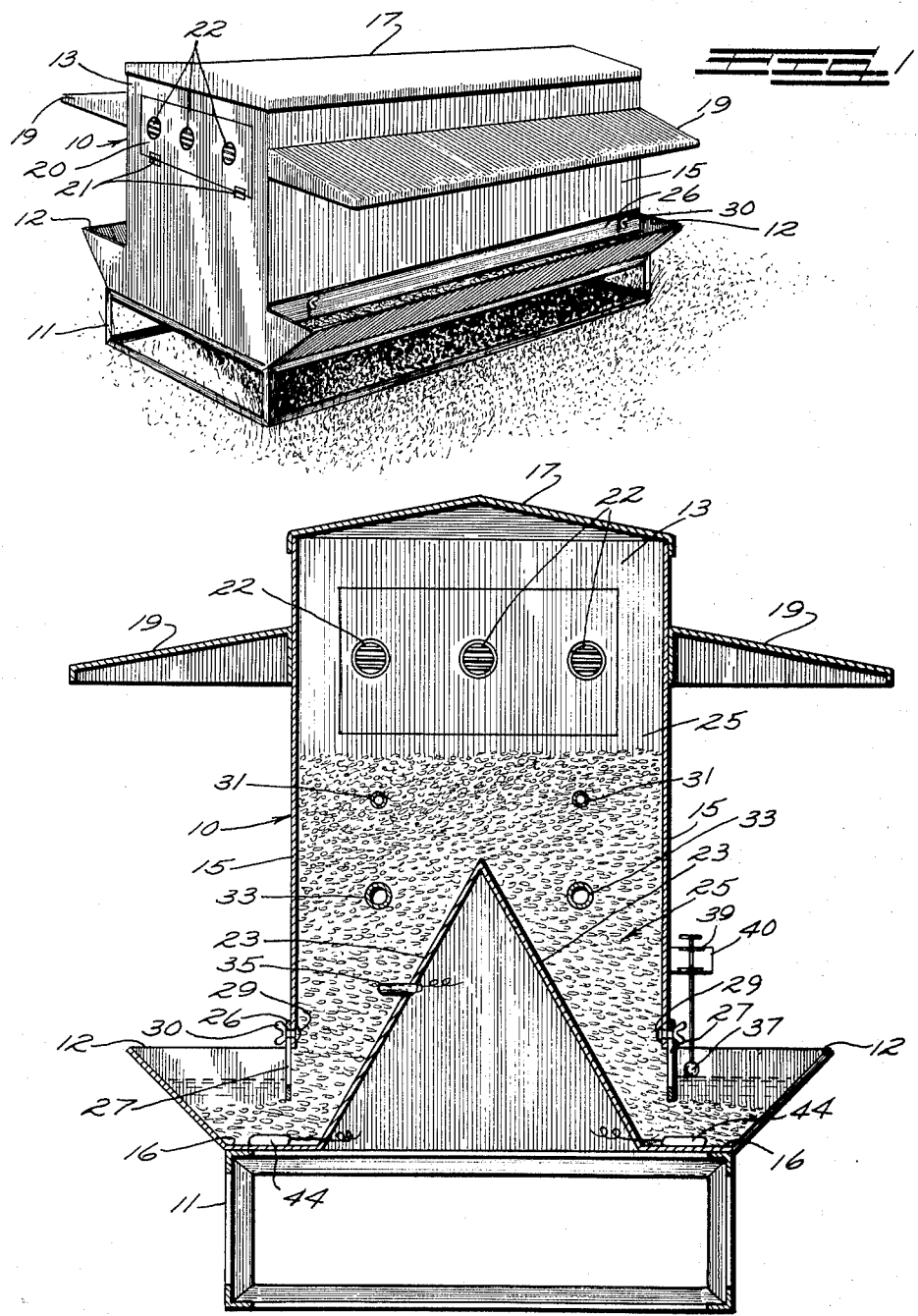
INVENTOR.
George Venca
BY
ATTORNEYS